United States Patent [19]

Ondrejka

[11] Patent Number: 5,277,609
[45] Date of Patent: Jan. 11, 1994

[54] MODULAR POWDERWAY FOR PARTITION PANELS AND THE LIKE (C-39)

[75] Inventor: Charles C. Ondrejka, Muskegon, Mich.

[73] Assignee: Steelcase Inc., Grand Rapids, Mich.

[21] Appl. No.: 890,621

[22] Filed: May 28, 1992

[51] Int. Cl.5 .................... H01R 25/16; H01R 13/58
[52] U.S. Cl. .................... 439/215; 439/211; 439/452
[58] Field of Search ..................... 439/207, 211, 214, 216

[56] References Cited

U.S. PATENT DOCUMENTS

| Re. 31,733 | 11/1984 | Haworth et al. | |
|---|---|---|---|
| 4,043,626 | 8/1977 | Propst et al. | 439/215 |
| 4,203,639 | 5/1980 | Vanden Hoek et al. | 439/215 |
| 4,235,495 | 11/1980 | Propst et al. | 439/215 |
| 4,278,834 | 7/1981 | Boundy | 439/209 |
| 4,295,697 | 10/1981 | Grime | 439/215 |
| 4,308,418 | 12/1981 | Van Kuik et al. | 439/209 |
| 4,313,646 | 2/1982 | Millhimes et al. | 439/215 |
| 4,370,008 | 1/1983 | Haworth et al. | 439/165 |
| 4,376,561 | 3/1983 | Vanden Hoek et al. | 439/210 |
| 4,377,724 | 3/1983 | Wilson | 439/209 |
| 4,382,648 | 5/1983 | Propst et al. | 439/209 |
| 4,429,934 | 2/1984 | Vanden Hoek et al. | 439/207 |
| 4,596,098 | 6/1986 | Finkbeiner et al. | 439/211 |
| 4,688,869 | 4/1987 | Kelly | 439/209 |
| 4,740,167 | 4/1988 | Millhimes et al. | 439/92 |
| 4,775,328 | 10/1988 | McCarthy | 439/211 |
| 4,781,609 | 11/1988 | Wilson et al. | 439/215 |
| 4,918,886 | 4/1990 | Benoit et al. | 174/48 |
| 4,952,164 | 8/1990 | French et al. | 439/215 |
| 4,992,058 | 2/1991 | Tanner | 439/211 |

FOREIGN PATENT DOCUMENTS 2080047  5/1981  United Kingdom .

OTHER PUBLICATIONS

Engineering Data Sheet, Panel Concepts, Inc., pp. 1–4, 1981.

Primary Examiner—Gary F. Paumen
Attorney, Agent, or Firm—Price, Heneveld, Cooper, DeWitt & Litton

[57] ABSTRACT

A power distribution system for office furniture includes a powerway having a power block with power block conductors therein. A intermediate connector block is supported on the power block and includes recesses for receiving outlet blocks having power outlets therein. The intermediate connector block may include a generally C-shaped housing which is assembled into the utility raceway between the top of the power block and the top of the utility raceway. In one embodiment powerway, cables includes woven sheaths. The woven sheaths are attached to a connector using a fastener.

15 Claims, 11 Drawing Sheets

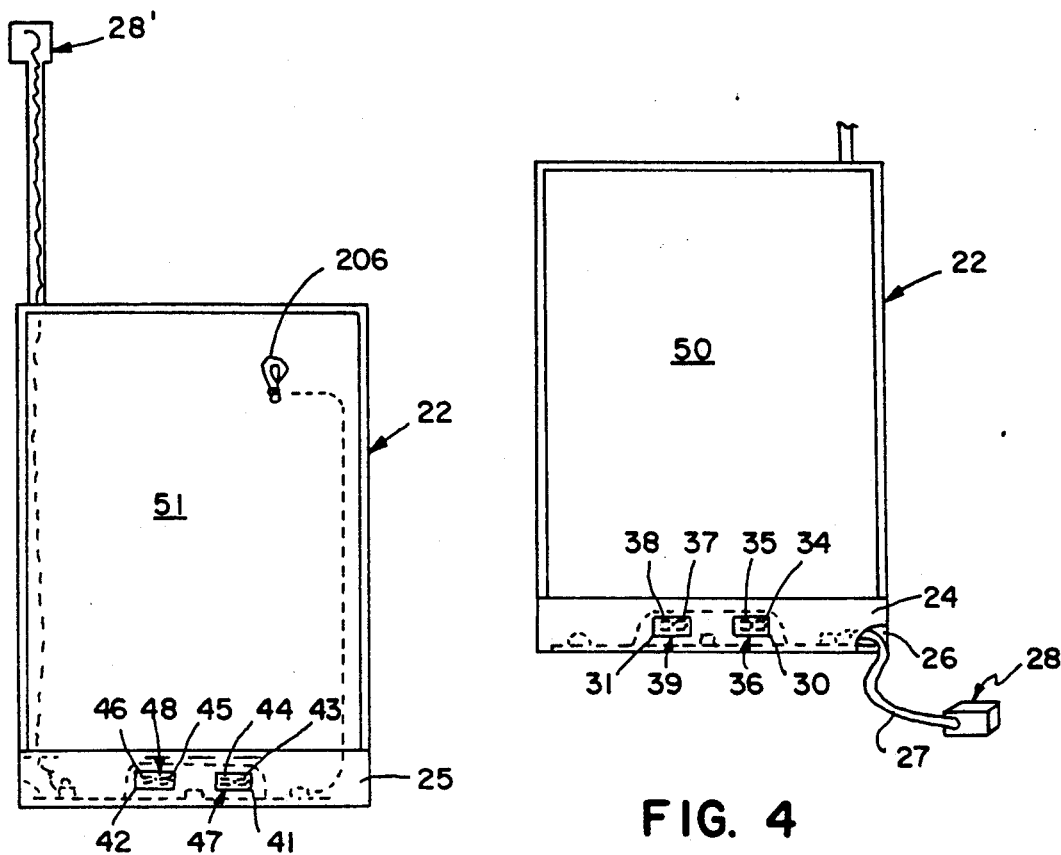
FIG. 5
FIG. 4
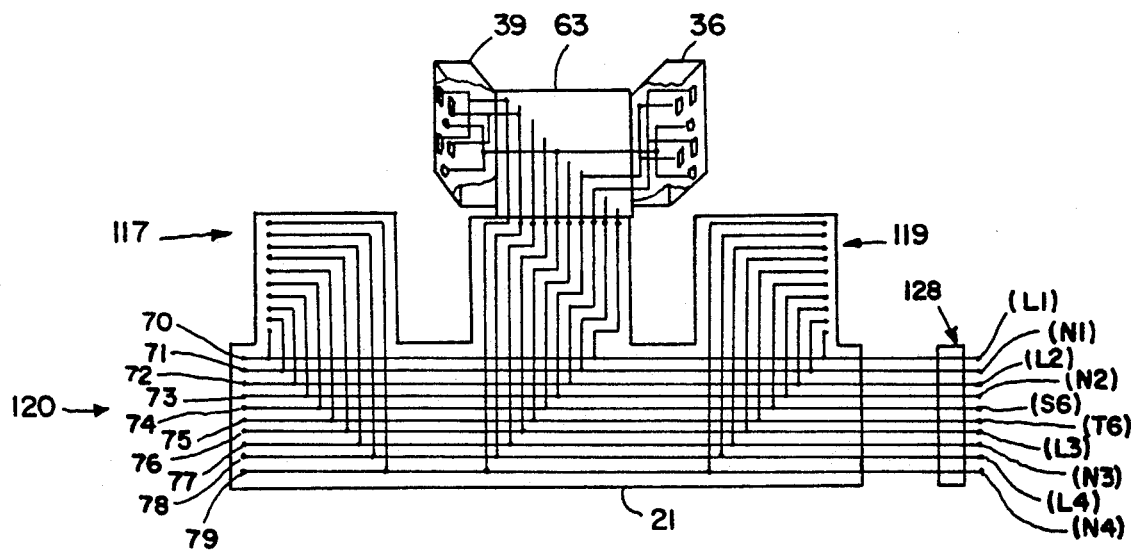
FIG. 6

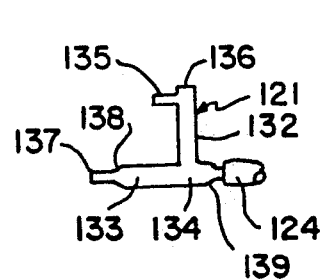
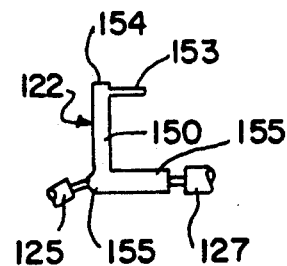
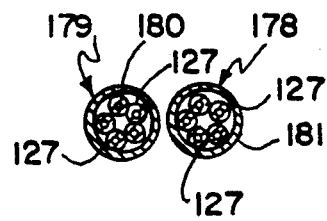
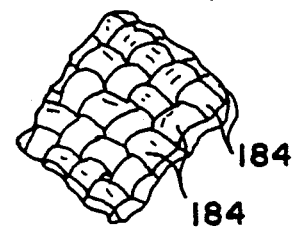
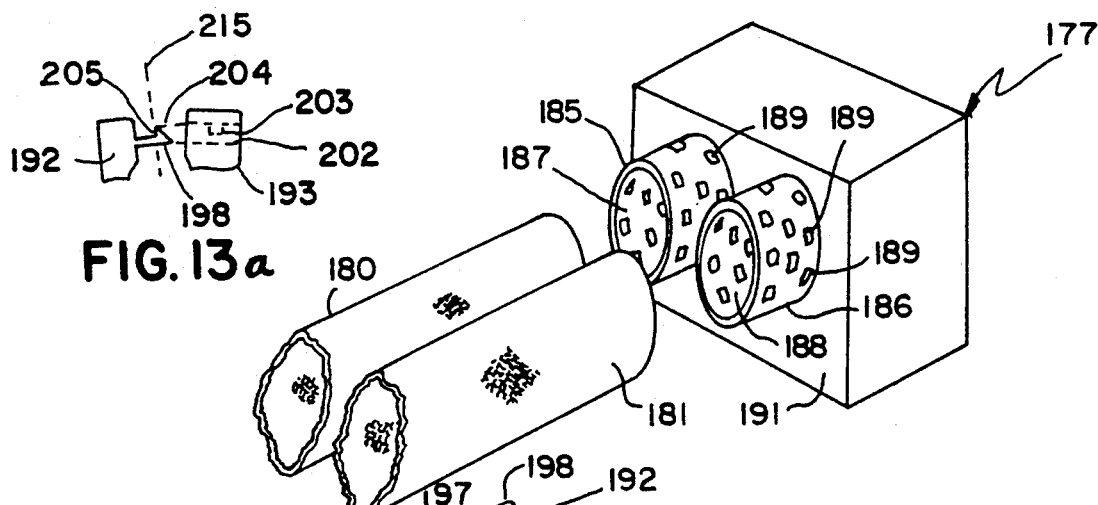

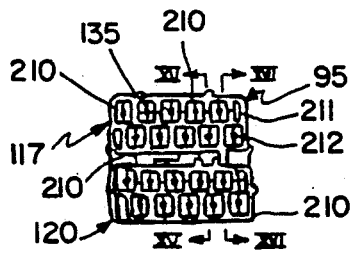
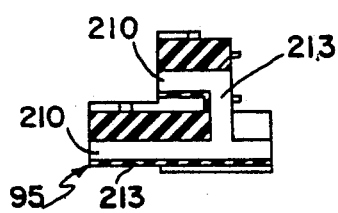
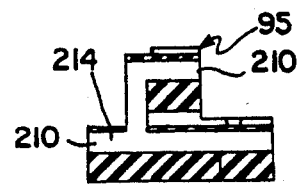
FIG. 14  FIG. 15  FIG. 16
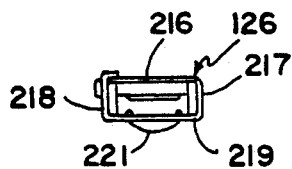
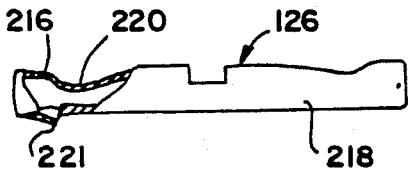
FIG. 17  FIG. 18
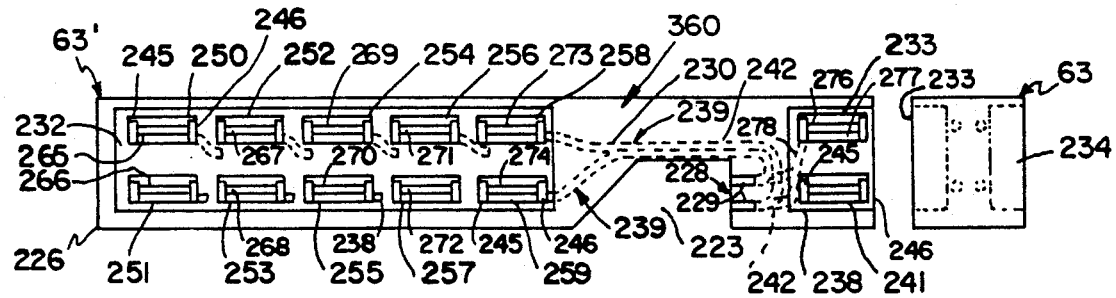
FIG. 19  FIG. 20
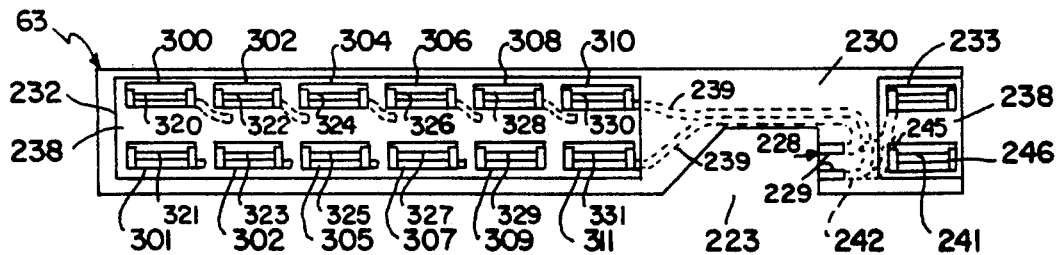
FIG. 21
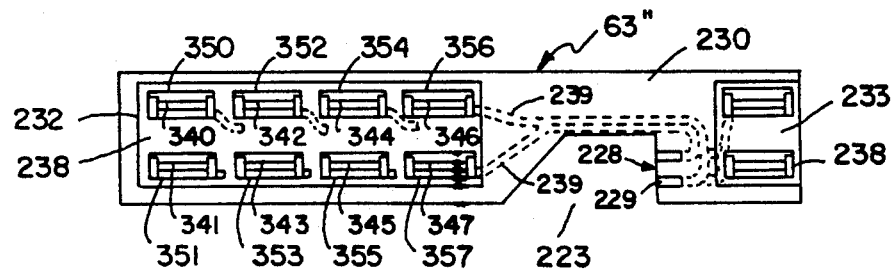
FIG. 22

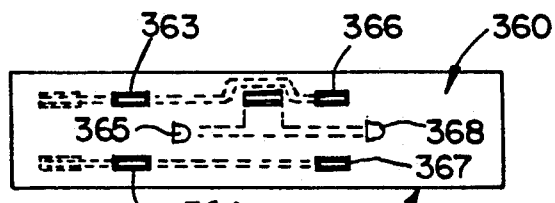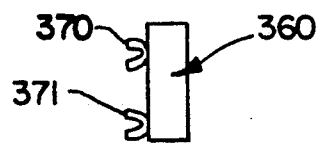
FIG. 23    FIG. 24
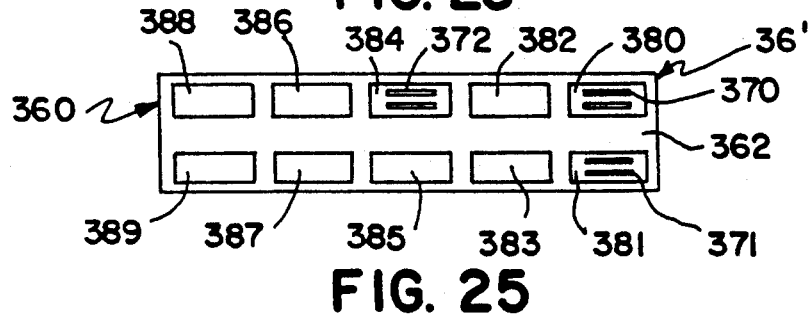
FIG. 25
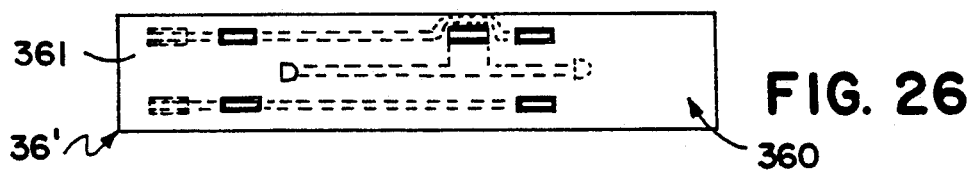
FIG. 26
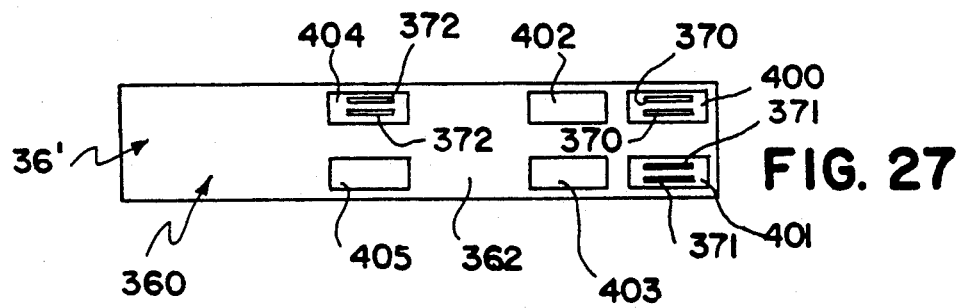
FIG. 27
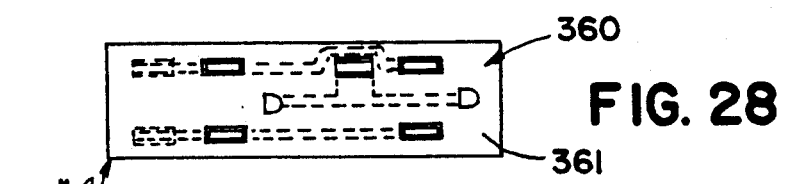
FIG. 28
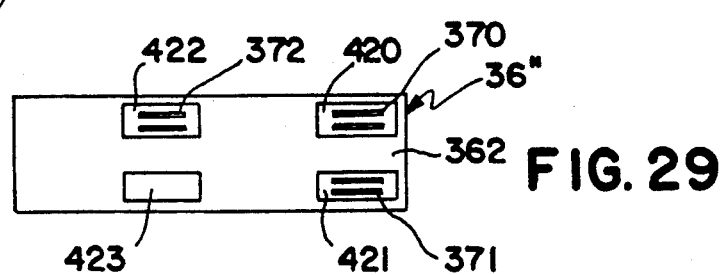
FIG. 29

MODULAR POWDERWAY FOR PARTITION PANELS AND THE LIKE (C-39)

BACKGROUND OF THE INVENTION

The present invention relates to electrification of office furniture and the like, and in particular to a modular power distribution unit therefor.

Open offices are well known and generally comprise large open floor spaces that are divided into individual offices or work stations. Several different furniture arrangements are presently available to divide such open office spaces and include partition panels, system furniture and modular furniture. These office arrangements are widely utilized as they are relatively easy to install, convenient to rearrange after installation, attractive in appearance and allow a large number of offices or work stations to be installed within an open floor space.

It is desirable that office furniture units include an electrical wiring system of some type. Such wiring systems preferably provide electrical power to the various work stations for typewriters, computers, dictating equipment, lights, clocks and other electrical appliances. The wiring system should not detrimentally effect the ease of installation, the convenience in rearranging the furniture after installation, or the attractive appearance of the furniture. Thus, to facilitate electrification, many furniture units include a utility raceway associated therewith in which the wiring system is housed.

A wide variety of wiring system for such office furniture units are currently available. These wiring system employ different techniques and arrangements to conduct electrical power through the office furniture unit and to interconnect adjacent office furniture units. Versatility, durability, electrical integrity, convenience of installation and rearrangement of furnished units, and overall safety are all important design consideration for a wiring system. An additional important design consideration is providing a wiring system which is adapted to fit within the limited confines of existing furniture units which also includes the capability of providing power to all the various electrical appliances at various work stations. Thus, it is desirable to provide a wiring system having a plurality of power supply circuits. However, the utility raceways of some existing furniture units are designed only for a three-wire power distribution system. Thus, it is desirable to provide a very compact or space efficient power distribution system with the versatility and convenience of a large number of wires in a powerway design to accommodate a three-wire power distribution system. Yet another desirable design goal is to increase the number of outlets which can be provided on an electrical circuit and still remain within National Electrical Code (NEC) requirements.

SUMMARY OF THE INVENTION

A modular power distribution unit for office furniture according to one aspect of the invention includes a powerway adapted to be assembled in a utility raceway of the office furniture. The powerway includes a plurality of powerway conductors. A powerway port accessible from above the powerway includes contacts of the powerway conductors. The powerway is assembled in the utility raceway and the connector contacts are connected to the port contacts to connect the electrical device to the powerway contacts According to another aspect of the invention, the the powerway port is substantially vertical. An outlet block, including outlet block conductors, is connected to a intermediate connector block and the intermediate connector block is connected to the powerway at the port to connect outlets in the outlet block to the powerway conductors.

A modular power distribution system according to another aspect of the invention includes a intermediate connector block having a generally C-shaped housing assembled over a powerway connector block. The intermediate connector block includes a intermediate connector block connector and the powerway connector block includes a powerway connector block connector. The intermediate connector block connector is connected to the powerway connector block connector to connect intermediate connector block conductors to powerway conductors.

According to yet another aspect of the invention, side-by-side cables extending between the powerway conductors and a connector each include some of the powerway conductors. In one embodiment, the sheaths include woven cords. The side-by-side cables provide a great degree of flexibility for manipulating the position of the connector.

In one other aspect of the invention, the sheath is attached to a housing using a fastener. The fastener provides a secure, quickly assembled connection of the sheath to the connector body.

The power distribution unit provides versatility and convenience of installation. Further, the power distribution unit utilizes the full width of the panel unit to house the electrical conductors of the power distribution system along the bottom of the panel unit. The power distribution system accordingly provides the versatility and convenience of a large number of supply circuits in the limited confines of utility raceways of existing furniture units. Additionally, the power distribution unit allows the number of outlets connected in a power supply circuit to be increased over existing systems without violating NEC requirements.

These and other objects, aspects and features of the invention will be more fully understood and appreciated by reference to the written specification and the appended drawings.

BRIEF DESCRIPTION OF THE DRAWINGS

FIG. 4 is front elevational view of an office furniture unit including the power distribution unit according to FIG. 1;

FIG. 5 is a rear elevational view of the office furniture unit of FIG. 4;

FIG. 6 is a circuit schematic of conductors in the powerway of FIG. 1;

FIG. 7b is a front elevational view of panel covers for the different length panels housing the powerways of FIG. 7a;

FIG. 8 is a fragmentary side elevational view of a conductor for the powerway according to FIG. 3;

FIG. 9 is a fragmentary side elevational view of a conductor for the powerway according to FIG. 3;

FIG. 10 is a fragmentary side elevational view of a conductor for the powerway according to FIG. 3;

FIG. 11 is a cross-sectional view of cables in the power distribution unit according to FIG. 1 taken along plane XI—XI in FIG. 1;

FIG. 12 is a fragmentary view of a sheath of a cable in the powerway according to FIG. 1;

FIG. 13 is an exploded fragmentary perspective view of a sheath, connector and fastener of the power distribution unit of FIGS. 1-3;

FIG. 13a is a fragmentary, perspective view of the fastener according to FIG. 13;

FIG. 14 is an end view of a powerway according to FIG. 1;

FIG. 15 is a cross-sectional view of a power block in the powerway taken along plane XIV—XIV in FIG. 14;

FIG. 16 is a cross-sectional view of a power block taken along plane XIV—XIV in FIG. 15;

FIG. 17 is an end view of a female contact in the power distribution unit according to FIG. 1;

FIG. 18 is side elevational view of the female contact according to FIG. 17 partially broken away;

FIG. 19 is a front elevational view of a intermediate connector block according to FIG. 1;

FIG. 20 is a side elevational view of the intermediate connector block of FIG. 19;

FIG. 21 is a front elevational view of an alternate embodiment of the intermediate connector block according to FIG. 1;

FIG. 22 is a front elevational view of another alternate embodiment of the intermediate connector block according to FIG. 1;

FIG. 23 is a front elevational view of an outlet block for connection to the intermediate connector block according to FIG. 19;

FIG. 24 is a side elevational view of the outlet block according to FIG. 23;

FIG. 25 is a rear elevational view of the outlet block according to FIG. 23;

FIG. 26 is a front elevational view of an outlet block for assembly to the intermediate connector block according to FIG. 21;

FIG. 27 is a rear elevational view of the outlet block according to FIG. 26;

FIG. 28 is a front elevational view of an outlet block for assembly to the intermediate connector block according to FIG. 22;

FIG. 29 is a rear elevational view of the outlet block according to FIG. 28;

DETAILED DESCRIPTION OF THE PREFERRED EMBODIMENT

Figure 1:
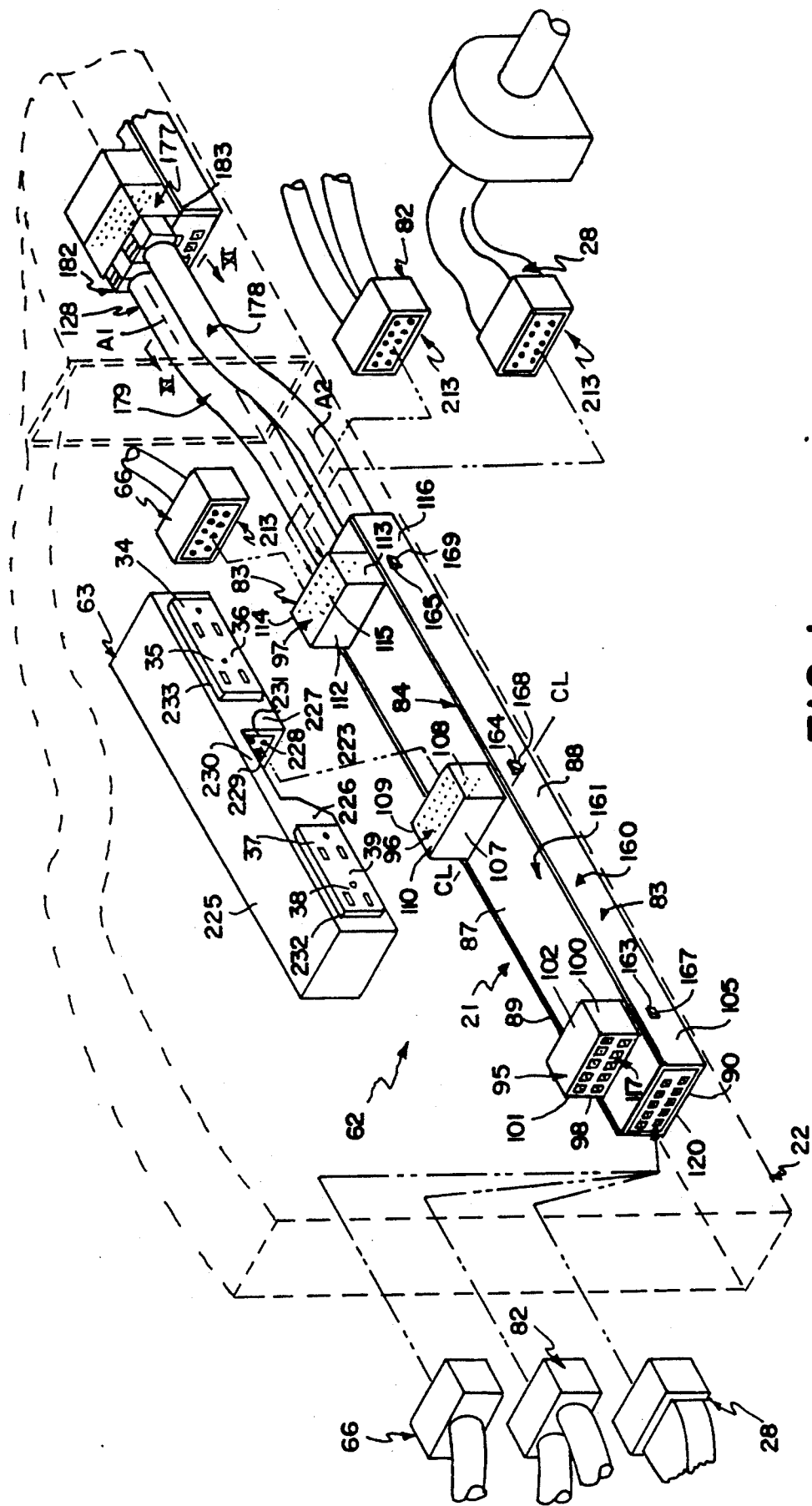
FIG. 1 is an exploded view of a powerway and related mounting components in accordance with the present invention.

A wiring system, according to the illustrated embodiment of the invention is adapted for use in various types of office furniture The wiring system includes a powerway 21 (FIGS. 1-3) which is particularly useful in office furniture of the type having a utility raceway. An example of such furniture is a partition panel 22 including a utility raceway 23 (best illustrated in FIG. 3) along a bottom edge thereof. However, powerway 21 can be utilized in a utility raceway which extends along the top edge of a partition panel or intermediate the top and bottom edges of a partition panel. Powerway 21 may also be utilized with system furniture, which is often used in conjunction with a partition panel system or includes work surface wiring arrangements. Modular furniture is also a contemplated application of the powerway. Hence, "office furniture" as used herein, includes all such office furniture arrangements as well as their equivalents. Those skilled in the art will recognize that powerway 21 will also find application in other similar settings and applications.

As illustrated in the drawings, a partition panel 22 (FIG. 3) has a conventional construction such as the panel construction disclosed in the U.S. Pat. Nos. 4,203,639; 4,308,418; 4,376,561 and 4,429,934, which are incorporated herein by reference. In this example, each partition panel 22 has a utility raceway 23 extending along the bottom edge of the panel. A pair of base trim covers 24 (FIG. 4) and 25 (FIG. 5) are connected to panel 22 to enclose raceway 23. Base trim cover 24 (FIG. 4) includes an optional opening 26 through which an associated cable 27 of a power tap-in 28 protrudes. Base cover 24 also includes openings 30 and 31 through which outlets 34 and 35 in outlet block 36 and outlets 37 and 38 in outlet block 39 are accessed. Base trim cover 25 similarly includes an opening 41 through which outlets 43 and 44 of an outlet block 47 are accessed. Base trim cover 25 also includes an opening 42 through which outlets 45 and 46 of an outlet block 48 are accessed. Partition panel 22 preferably includes opposite faces 50 (FIG. 4) and 51 (FIG. 5) with a base trim cap 52 (FIG. 3) extending along a bottom side thereof. A base plate 55 extends along utility raceway 23 and has its opposite ends connected with and supported by supports 56 and 57. The utility raceway 23 thus extends between base plate 55 and base trim cap 52. A pair of adjustable feet 58 and 59 are mounted in supports 56 and 57 and support partition panel 22 vertically on a horizontal floor.

A power distribution unit 62 (illustrated in FIGS. 1-3) is shaped to be received in a utility raceway 23 of any partition panel 22. In general, power distribution unit 62 includes powerway 21, an intermediate connector block 63 assembled to powerway 21, outlet blocks 36 (FIG. 1), 39, 47 (FIG. 2) and 48 assembled to intermediate connector block 63, a power tap-in 28, and an optional light harness 66. Powerway 21, intermediate connector block 63, outlet blocks 36 (FIG. 1), 39, 47 (FIG. 2) and 48, power tap-in 28, and light harness 66 are assembled to form the power distribution unit as described in greater detail hereinbelow. Ten powerway conductors 70–79 (FIG. 6) are positioned in powerway 21 to provide an electrical bus through powerway 21 and panel 22. A light harness 66, power tap-in 28, and a T-connector 82 from of an adjacent powerway connect to conductors 70–79 when these accessories are assembled to powerway 21 as also described in greater detail hereinafter.

Somewhat more particularly, powerway 21 includes an elongated housing 83 (FIGS. 1 and 2) extending horizontally within utility raceway 23. Housing 83 (FIG. 1) includes a base 84 having a top wall 87, opposite sidewalls 88 and 89 (FIG. 2), and a bottom wall 90 (not shown). Walls 88–90 have substantially the same length. However, the height of base 84 is preferably less than the width thereof such that powerway 21 utilizes the full available width of the utility raceway while leaving vertical space within the utility raceway for intermediate connector block 63. This allows powerway 21 to include a relatively large number of conductors connected to a plurality of power supplies within the limited confines of existing utility raceways A T-connector 128 extends from an end 116 of powerway housing 83. Connector 128 is utilized to connect powerways in adjacent panels as described in greater detail hereinbelow.

Figure 7A:
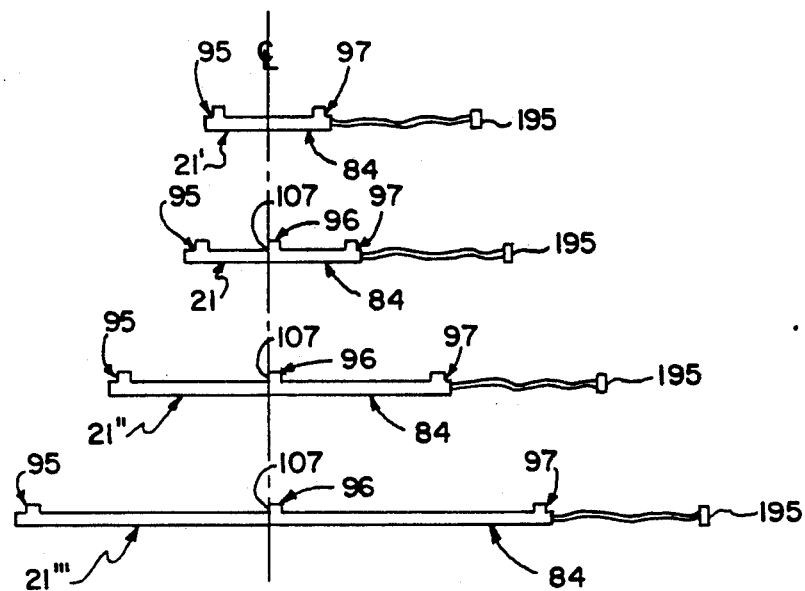
FIG. 7a is a side elevational view of powerways according to FIG. 1 for different length panels.

Generally rectangular power blocks 95–97 project orthogonally through top wall 87 of base 84 of powerway 21. Power block 95 includes a face 98, a back wall 99 (FIG. 2), opposite sidewalls 100 (FIG. 1) and 101 (FIG. 2, and a top wall 102. Power block 95 is located at end 105 of powerway housing 83. Power block 96 similarly includes a face 106 (FIG. 2), a back wall 107 (FIG. 1), opposite sidewalls 108 and 109 (FIG. 2:,, and top wall 110. Back wall 107 of power block 96 is positioned at approximately the center $C_L$ (FIG. 7a) of base 84 (FIG. 7a) and panel face 24 (FIG. 7b) for an intermediate connector block 63 having a central connector as disclosed in FIGS. 1–3. The center $C_L$ of base 84 and the centerline $C_L$ are preferably aligned when the powerway is assembled in the utility raceway to facilitate the connection of powerways in adjacent panels as described in greater detail hereinbelow. Power block 97 includes a face 111 (FIG. 2), a back wall 112 (FIG. 1), opposite sidewalls 113 and 114 (FIG. 2) and a top wall 115. Power block 97 is located at end 116 of base 84. Faces 98, 106 and 111 are preferably substantially vertical when the powerway 21 is assembled horizontally in a utility raceway. Each of faces 98, 106, and 111 includes a respective port 117–119 providing access to electrical conductors 70–79 (FIG. 6) in powerway 21. An additional port 120 (FIG. 1) is located on end 105 of base 84, below port 117. Port 120 also provides access to conductors 70–79.

Powerway 21 houses conductors 70–79 (FIG. 6) as described briefly above. Each of conductors 70–79 includes a generally L-shaped male electrical contact 121 (FIG. 3) on end 105 of powerway 21. Another generally L-shaped electrical contact 122 is provided on end 116 of powerway 21 A generally L-shaped electrical contact 123 is also positioned intermediate ends 105 and 116 of powerway 21. A wire 124 connects contacts 121 and 122 of each conductor. A wire 125 connects contacts 122 and 123 of each conductor. A female contact 126 of a T-connector 128 is connected to contact 122 by a wire 127.

Contact 121 (FIG. 8) includes a shoulder 132. An arm 133 extends substantially orthogonally from an end 134 of shoulder 132. A male contact blade 135 extends orthogonally from an end 136 of shoulder 132. A male contact blade 137 extends from a tip 138 of arm 133. Wire 124 is connected to a tip 139 of arm 133. Wire 124 is connected to tip 139 by suitable means such as welding. Contact 121 is of any suitable construction such as stamped from a suitable electrically conductive metal alloy.

The generally L-shaped contact 123 (FIG. 9) includes a body 144. A male contact blade 145 extends orthogonally from an end 146 of body 144. Wire 125 is connected to a projection 148 on end 147 of body 144. Wire 124 is connected to a projection 149 at end 147 of body 144. Contact 123 is of any suitable construction such as stamped from an electrically conductive material such as a metal alloy.

Contact 122 (FIG. 10) includes a shoulder 150. An arm 151 extends substantially orthogonally from an end 152 of shoulder 150. A male contact blade 153 extends orthogonally from an end 154 of shoulder 150. Wire 125 is connected to tip 155 of contact 122. Wire 127 is connected to an arm 151 which projects orthogonally from body 150. Wires 125 and 127 are connected to contact 119 by any suitable means such as welding. Contact 122 is of any suitable construction such as stamped from a suitable conductive alloy.

Those skilled in the art will recognize that the ten conductors 70–79 (FIG. 6) in powerway 21 may be connected to a variety of different circuits, such as voice and data communication circuits, a 110 volt power supply, a 220 volt power supply, or the like, through power tap-in 28. In the illustrated embodiment of the invention, the ten powerway conductors 70–79 are connected to four 110 volt power sources, safety ground and isolated ground through power tap-in 28. Power tap-in 28 is connected to any one of the ports 117–120 of powerway 21 to connect to conductors 70–79.

Somewhat more particularly, in the illustrated embodiment of the invention, conductors 70 and 71 are connected to a live conductor (L1) and a neutral conductor (N1) of a first power supply. Conductors 72 and 73 are connected to a live conductor (L2) and a neutral conductor (N2) of a second power supply. Conductors 74 and 75 are connected to safety ground and isolated ground respectively. Conductors 76 and 77 are connected to a live conductor (L3) and a neutral conductor (N3) of a third power supply. Conductors 78 and 79 are connected to a live conductor (L4) and a neutral conductor (N4) of a fourth power supply. Those skilled in the art will recognize that the total number of outlets which can be connected to a single two-wire, 110 volt power supply is limited. If too many outlets are connected to a single power supply, NEC maximum allowances will be exceeded. The four power supplies of the illustrated embodiment are used to provide a large outlet capacity for the office furniture system without exceeding NEC requirements.

Figure 2:
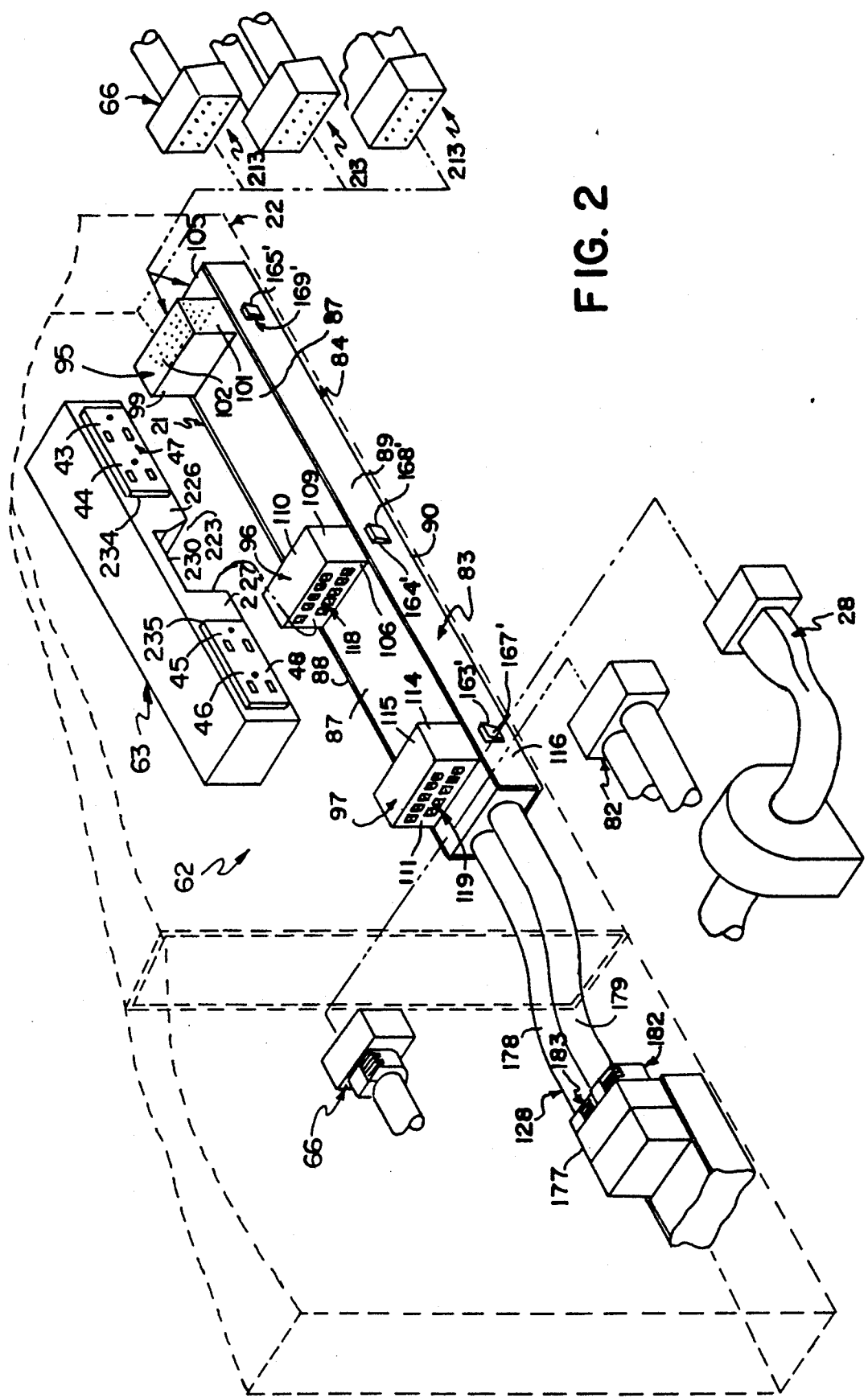
FIG. 2 is an exploded view of the powerway and related mounting components according to FIG. 1 from another perspective.

In the embodiment illustrated in FIGS. 1 and 2, the power block includes two housing sections 160 and 161. An elongated bottom housing section 160 has a U- shaped cross section including sidewall 88, sidewall 89, and bottom wall 90. The top housing section 161 includes power blocks 95-97 and top wall 87. Power blocks 95-97 and top wall 87 according to the embodiment of FIGS. 1 and 2 are preferably of an integral construction, and may for example be an integrally molded polymeric material. Alternatively, the power blocks 95-97 may be attached to top wall 87 using conventional means (not shown) such as an adhesive, snap connector, or the like. The bottom housing 160 is constructed of any suitable dielectric material such as an integrally molded organic polymer. Top housing 161 includes outwardly projecting snap connectors 163-165 which are received in respective openings 167-169 of sidewalls 88. Identical snap connectors 163'-165' are provided in top housing 161 for receipt in openings 167'-169' of wall 89. The snap connectors 163-165 and 163'-165' are received in openings 167-169 and 167'-169' to secure the engagement of the top and bottom housing sections 160 and 161.

Figure 3:
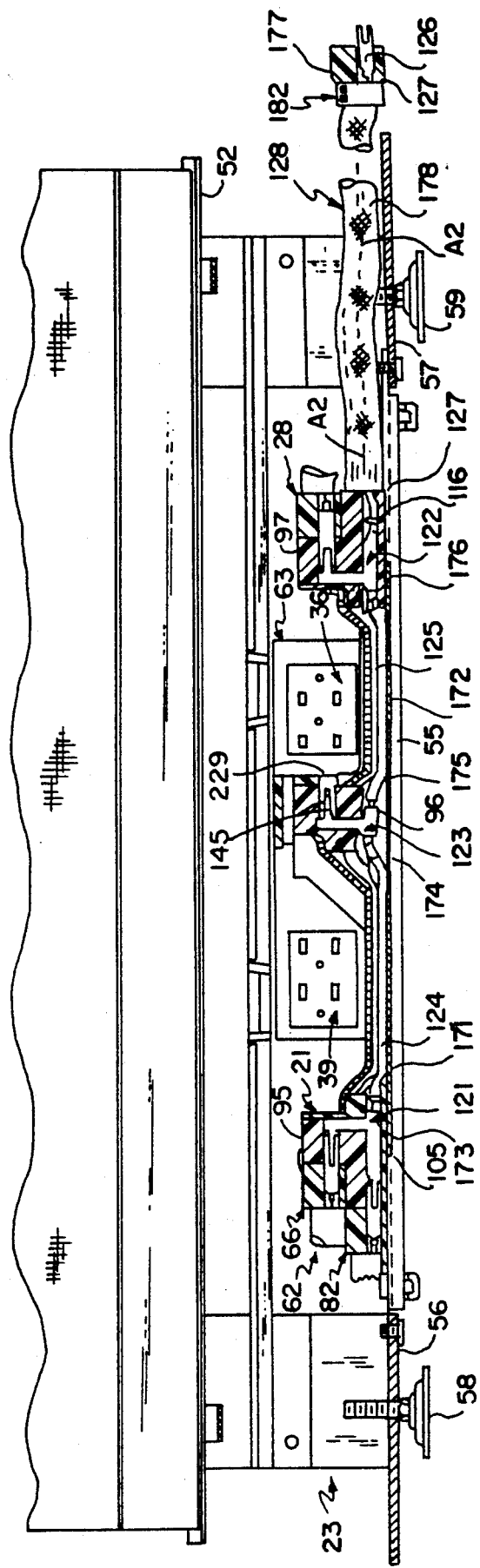
FIG. 3 is a side view partially broken away of a powerway and related mounting components according to FIG. 1 installed in the utility raceway of office furniture.

In an alternate embodiment of housing 83 of powerway 21 illustrated in FIG. 3, the three dielectric power blocks 95-97 are interconnected by channel members 171 and 172. Power block 95 is connected to one end 173 of channel member 171. Power block 96 is connected to the other end 174 of channel member 171. One end 175 of channel member 172 is connected to power block housing 96. The other end 176 of channel member 172 is connected to power block 97. Channel members 171 and 172 are rectangular in cross-sectional configuration and include a central passage for wires 124 and 125. The channel members are formed of any suitable construction such as an integrally molded organic polymer or a metal sheet which is folded to form the central passage. Channel members 171 and 172 preferably provide a rigid support between each of power blocks 95-97. The channel members are attached to power blocks 95-97 by any suitable means (not shown) such as snap connectors, threaded fasteners, an adhesive, or the like.

Regardless of which powerway housing construction is utilized, T-connector 128 (FIGS. 1-3) extends from power block 97. The T-connector includes a male connector housing 177 having the female contacts 126 (FIG. 3) of conductors 70-79 mounted therein. Two cables 178 and 179 extend side-by-side between housing 177 and power block 97. Cable 178 includes five wires 127 (FIG. 11 only some of which are numbered) within a sheath 180 and cable 179 includes five wires 127 (only some of which are numbered) within a sheath 181. Sheaths 180 and 181 are connected to housing 177 using fasteners 182 and 183 as described in greater detail hereinafter. Although the illustrated cables extend side-by-side in a horizontal plane as illustrated in FIGS. 1-3, it is envisioned that the cables may extend side-by-side in a vertical plane, a diagonal plane, or any other plane.

Sheaths 180 and 181 are formed from woven cord 184 (FIG. 12) manufactured from a suitable dielectric material, and are preferably constructed of woven fiberglass cord. The interlaced cords are oriented at an angle of approximately 45° relative to longitudinal axes $A_1$ (FIG. 1) and $A_2$ (FIGS. 1 and 3) of cables 178 and 179, respectively. The woven sheaths are surprisingly flexible and facilitate manipulation of T-connector 128 around corners to connect with adjacent powerways which are non-linearly oriented relative to powerway 21. Because the woven sheaths exert minimal resistance to bending, side-by-side cables 178, 179 may be readily folded or twisted in any direction to extend around corners and obstructions in utility raceways The connector housing 177 includes generally cylindrical, or oval, collars 185 (FIG. 13) and 186 having central openings 187 and 188 for receipt of wires 127. Collars 185 and 186 include apertures, or recesses, 189 (illustrated as apertures, only some of which are numbered) for receipt of teeth 190 (only some of which are numbered) of fasteners 182 and 183 as described in greater detail herein below. The collars project orthogonally from a wall 191 of connector housing 177. Collars 185 and 186 are integrally molded with the generally rectangular body of housing 177 from any suitable dielectric material such as of an organic polymer.

Woven sheaths 180 and 181 are secured to collars 185 and 186 by fasteners 182 and 183. Fasteners 182 and 183 are identical, and accordingly, only fastener 182 is described in greater detail hereinafter. Fastener 182 includes two fastener housing sections 192 and 193 which are connected by a hinging member 194. In the illustrated embodiment, hinging member 194 is a thin section integrally formed with sections 192 and 193. However, hinging member 194 may be provided by any suitable hinging device which is mounted on sections 182 and 183. Housing sections 192 and 193 each include a respective recess 195 and 196. Recesses 195 and 196 are complementary to collars 185 and 186 and include projecting teeth 190 (only some of which are numbered;. Housing section 192 also includes integral, outwardly projecting male mechanical connectors 197 and 198, each of which includes a locking element 199. Locking element 199 includes a forwardly sloping wall 204 (FIG. 13a) on one end and an edge 205 opposite wall 204. Housing section 193 includes two female mechanical connectors 200 and 201. Each of the female mechanical connectors 200 and 201 includes an opening 202 and a ridge 203. Ridge 203 engages edge 205 of 199 locking element 198 when the locking element is fully inserted into opening 202. According to one envisioned embodiment of the invention, the cross-sectional dimension of locking element 199 in plane 215 is substantially the same as the size of opening 202. Accordingly, edge 205 of the locking element can not move past ridge 203 after edge 205 and ridge 203 are juxtaposed.

To connect the sheath 180 to collar 185, sheath 180 is positioned over collar 185 such that a portion of the sheath overlaps the collar. Fastener 182 is positioned adjacent sheath 180 such that the fastener abuts wall 191 of connector housing 177. Housing sections 192 and 193 are folded at hinging member 194. Teeth 190 are positioned adjacent sheath 180 such that each tooth 190 engages collar 185 at an aperture 189. The locking elements 199 of male mechanical connectors 197 and 198 are inserted into opening 202 and forwardly sloping wall 204 allows the lock element 199 to move past ridge 203. When connectors 197 and 198 are fully inserted, edge 205 engages ridge 203 of fastener 182, the fastner circumscribes the sheath, and teeth 190 bite into apertures 189 in collar 185. Accordingly, the teeth press sheath 181 into collar 185 which prevents the sheath from seperating from housing 177. Sheath 181 is likewise connected to collar 186 using fastener 183. Cables 178 and 179 are accordingly quickly and securely attached to connector housing 177 using fasteners 182 and 183.

Although the sheaths 180, 181 and fasteners 182, 183 are illustrated with T-connector 128 for connecting adjacent powerways, it will be recognized that woven sheaths and snap fasteners may also be advantageously utilized for cables extending between other electrical devices, such as a panel lamp 206 (FIG. 5) and wire harness 66 (FIG. 2), floor power tap-in 28 (FIG. 4), or ceiling power tap-in 28' (FIG. 5), to facilitate connection and manipulation of these cables. It will also be recognized that fasteners 182 and 183 may be utilized to secure the sheath of single cable to a connector including one or more collars such as collar 185 (e.g., in wire harness 66).

Powerway 21 includes four ports 117-120 as described briefly above, which ports provide access to conductors 70-79. Each of these four ports are identical and accordingly only port 117 is described in greater detail hereinafter. Port 117 includes ten openings 210 (FIG. 14 only some of which are numbered) arranged in two rows 211, 212 of five openings each. The openings 210 in row 211 are horizontally staggered with respect to the openings 210 in row 212. The contacts, such as contact 121 (FIG. 8) are positioned in channels 213 (FIG. 15) and 214 (FIG. 16) which extend to openings 210. The contacts in row 211 are positioned in upper channels 214. The contacts in row 212 are positioned in lower channel 213. Since the openings in rows 211 and 212 are staggered, and thus do not overlap vertically, openings 210 for adjacent conductors have a common horizontal extent or overlap horizontally. This minimizes the width of powerway 21 and insures that powerway 21, including ten or more conductors, will fit within the limited confines of utility raceways in existing office furniture units. A male contact, such as blade 135 of a respective one of contacts 121, is positioned in each opening 210. The openings 210 are larger than the male contact blades to receive female contacts 126 of a male connector, such as T-connector 128, assembled to the port.

Power tap-in 28, T-connector 128, light harness 66, T-connector 82, and intermediate connector block 63 each include an identical male connector 213 which will mate with any one of ports 117-120. This provides a great deal of flexibility in arranging the power distribution unit. Port 118 is preferably reserved for intermediate connector block 63 such that the center of intermediate connector block 63 is positioned at the center $C_L$ of base 84 of powerway housing 83.

Because the male connectors 213 are identical, only connector 213 of T-connector 128 (FIGS. 1-3) is described in greater detail hereinafter. T-connector 128 includes a connector housing 177. Housing 177 includes two rows of five openings (not shown) which house female contacts 126 of conductors 70-79. Each contact 126 connects with a respective blade in one of ports 117-120 of a powerway associated with an adjacent panel. A channel 214 is provided in housing 177 to receive each of the female contacts 126. Housing 177 also includes channel 215 which receives each of the wires 127 of conductors 70-79. Housing 177 is of any suitable dielectric material construction such as a molded polymeric material Female contact 126 according to one envisioned embodiment is illustrated in FIGS. 17 and 18. Connector 127 includes a top wall 216, sidewalls 217 and 218, and bottom wall 219. In the illustrated embodiment, walls 217 and 218 extend substantially orthogonally to, and between, walls 216 and 219. Top wall 216 preferably includes an engagement member 220 (FIG. 18) which engages a male contact blade, such as blade 135 of contact 121. The illustrated engagement member 220 includes a curved segment in top wall 216. However, the engagement member may be a barb, or the like. Engagement member 220 frictionally contacts an edge of male contact blade 135. Contact 127 also includes an outwardly projecting member 221 which engages the inner wall of an opening in a port such as opening 210 in port 217. The female contacts 127 in T-connector 128 accordingly secure the male connector housing 177 in engagement with powerway 21. Although the illustrated female contact 126 is generally rectangular in cross-sectional configuration, as illustrated in FIG. 17, a cylindrical female contact is also envisioned.

The duplex intermediate connector block 63 illustrated in FIGS. 1-3 and 19-22 includes a generally C-shaped molded plastic housing 225. The molded plastic housing 225 (FIGS. 1 and 2) includes two outwardly projecting arms 226 and 227 joined by a shoulder 230. Shoulder 230 and arms 225, 226 form a recess 223 in the housing. Arms 226 and 227 support intermediate connector block 63 on top wall 87 of housing 83. The shoulder 230 extends over intermediate connector block 96 when the intermediate connector block is received in recess 223 as illustrated in FIG. 3. Arm 226 includes a central connector 228 (FIG. 1) on an inside wall 231 for connection with conductors 70-79 through port 118. Connector 228 (FIG. 1) includes female contacts 229 (FIGS. 3, 19, 21 and 22) for connection with contact blades 145 (FIGS. 3 and 9) of contact 122. Female contacts 229 are preferably identical to female contacts 127 (FIGS. 17 and 18) described above. Receptacle block 63 also includes four generally rectangular recesses 232-235 (only three are shown in FIGS. 19 and 20). Each recess receives a duplex outlet block 36, 39, 47, 48. Recesses 232-235 are identical such that outlet blocks 36, 39, 47 and 48 may be inserted into any one of the recesses. Openings 250-259 (FIG. 19) are provided in a back wall 238 of each recess for accessing conductors 239 in the intermediate connector block 63.

The intermediate connector block includes ten conductors 239 (FIG. 19) having a respective one of contacts 265-274, supported in each of the openings 250-259 in back wall 238 and a contact 229 in connector 228. In one envisioned embodiment illustrated in FIG. 19, each of the ten conductors 239 are identical. Accordingly, only the conductor 239 including contacts 265 and 276 is described in greater detail hereinafter. The conductor 239 including contact 265 has a female contact 229, male contact 265 in opening 250, and a wire 242 (illustrated in phantom) connected between contact 229 and contact 265. Conductor 239 also includes a contact 276 in one opening contacted to contact 229 by wire 278 conductor 239 also includes a contact in recesses 234 and 235 such that a contact in each of the four outlet block recesses 232-235 include a contact connected to each contact 229. Contact 265 is of any suitable construction such as a stamped metal strip having a length approximately equal to the length of the openings. Wire 242 is connected to contact 265 by any suitable means such as welding, snap connectors, or the like. Contact 265 is mounted in opening 250 by any suitable means such as snap connectors 245, 246, or the like.

Three different arrangements of openings may be provided in back wall 238 of duplex recesses 232-235. In the embodiment illustrated in FIG. 19, ten openings 250-259 are provided in two rows of five openings each. Electrical contacts 265-274 are supported within openings 250-259 of intermediate connector block 63.

Each of the contacts 265-274 is connected to a respective contact 229 in connector 228. Connector 228 is connected with port 118 to connect the intermediate connector block conductors 239 to conductors 70-79 in powerway 21. When connector 228 connects with port 118, contacts 265-274 are connected with conductors 70-79 respectively by contact 229.

In one alternate embodiment of the intermediate connector block 63 for receipt of duplex outlets, illustrated in FIG. 21, twelve openings 300-311 are provided on back wall 238. A respective contact 320-331 is secured within each opening 300-311 in the intermediate connector block 63 by respective contact holders (such as 245 and 246 FIG. 19). Contacts 324 and 327 are connected to a contact 229 which connects with safety ground conductor 74 when connector 228 is connected to port 118. Contacts 325 and 326 are connected to a contact 229 which connects to isolated ground conductor 75 when the connector 228 connects to port 118. Contacts 320-323 and contacts 328-331 are connected to respective contacts 229 which connect with conductors 70-73 and 76-79, respectively, when connector 228 is connected to port 118.

In yet another embodiment of intermediate connector block 63 for receipt of a duplex outlet block, illustrated in FIG. 22, eight openings 350-357 are provided in back wall 238 of each of the recesses 232-235. Contacts 340-347 are positioned within openings 350-357, respectively. Contacts 340 and 341 are connected to respective contacts 229 which connect with the live and neutral conductors of one of the four power supply circuits when connector 228 is connected to port 18. Contacts 342 and 343 are connected to respective contacts 229 which connect the live and neutral conductors of another one of the four power supply circuits when connector 228 is connected to port 118. Contacts 344 and 347 are connected to a contact 229 which connects to safety ground conductor 74 when connector 228 connects to port 118. Contacts 345 and 346 are connected to a contact 229 which connects to the isolated ground conductor 75 when connector 228 is connected to port 118.

Duplex outlet blocks 36, 39, 47 and 48 include a generally rectangular molded housing 360 (FIGS. 23-25) for assembling in recesses 232-235 (FIGS. 1 and 2). Outlet blocks 36, 39, 47 and 48 are identical, and accordingly only outlet block 36 is described in greater detail hereinafter. Additionally, it will be recognized that the outlet blocks for each of the receptacle blocks of FIGS. 23-25 are the same except for the length and the number of openings in a back wall 362 (FIG. 25) as described hereinbelow. Conventional contacts, illustrated in phantom in FIG. 23, are mounted within housing 360. Each housing includes a front wall 361 (FIG. 23) and back wall 362 (FIG. 25). Front wall 361 includes outlet openings 353-365 for a first outlet and openings 366-368 for a second outlet. Conventional contacts (not shown) for connection with the conventional male contact blades of a two or three prong plug of the type typically found on lamps, typewriters, radios, computer equipment, appliances, and the like, are positioned within housing 360 for access through openings 363-368. Three female contacts 370-372 (FIGS. 24 and 25) project outwardly through openings in back wall 362. Contact 370 is connected to conventional contacts positioned within outlets 363 and 366. Contact 371 is connected to conventional contacts located within openings 364 and 367. Contact 372 is connected to conventional contacts within openings 365 and 368, respectively. Female contacts 370-372 are positioned on outlet housing 360 such that they connect to selected conductors in powerway 21 as described in greater detail hereinbelow.

Female contacts 370-372 are positioned on outlet block 36 to connect with contacts in intermediate connector block 63 according to the number of openings in intermediate connector block 63. Thus, for intermediate connector block 63 (FIG. 19) including ten openings, outlet block 36 (FIG. 25) includes ten openings 380-389. Female contacts 370 and 371 project though openings 380 and 381 to connect with contacts 265 and 266 in intermediate connector block 63, and thus to the first power supply conductors in powerway 21. Contacts 370 and 371 project through openings 382 and 383 to connect with contacts 267 and 268 in intermediate connector block 63, and thus to the second power supply in powerway 21. Contacts 370 and 371 project through openings 386 and 387 to connect with contacts 271 and 272 in intermediate connector block 63, and thus to the third power supply in powerway 21. Contacts 370 and 371 project through openings 388 and 389 to connect with contacts 273 and 274 and thus to the fourth power supply in powerway 21. The third female contact 372 projects through opening 384 to connect with contact 269 in intermediate connector block 63, and thus to the safety ground conductor in the powerway 21. Alternatively, contact 372 projects through opening 385 to connect with contact 270 in intermediate connector block 63, and thus to the isolated ground connector in the powerway 21. Those skilled in the art will recognize that the contacts extend between the openings 380-389 through which they project and the openings 363-368 which receive plug contacts.

If the intermediate connector block includes twelve openings (FIG. 21), the outlet block 361 (FIG. 26) includes six openings 400-405 (FIG. 27). Female contacts 370 and 371 project through openings 400 and 401 to connect with contacts 320 and 321 or 330 and 331 in intermediate connector block 63, and thus to the first or fourth power supply in powerway 21. Female contacts 370 and 371 project through openings 402 and 403 to connect with contacts 322 and 323 or 328 and 329 in intermediate connector block 63 and thus to the third or fourth power supply in powerway 21. Contact 372 projects through opening 404 to connect to contact 324 or contact 327 in intermediate connector block 63, and thus to the safety ground in powerway 21 contact 372 projects through opening 405 to connect to contact 325 or contact 326 in intermediate connector block 63, and thus to safety ground in powerway 21. If female contacts 370 and 371 project through openings 400 and 401, the outlets on the outlet block will be electrically connected with the first power supply in a first angular orientation and the second power supply in a second angular orientation rotated 180° with respect to the first angular orientation. If female contacts 370 and 371 project through openings 402 and 403, the outlet will connect with the third power supply in the first angular orientation and the fourth power supply in the second angular orientation rotated 180 with respect to the first angular orientation. If contact 372 projects through opening 304 the outlets will connect to isolated ground in both the first or second orientation. If contact 372 projects through opening 305, the outlets will connect with safety ground in both the first and second orientations of the power block.

Where the intermediate connector block includes eight openings in each recess (FIG. 22), the outlet block 63 (FIG. 28) includes four openings 420-423 (FIG. 29). Female contacts 370 and 371 project through openings 420 and 421. Contact 372 projects through opening 422 or opening 423. If contact 372 projects through opening 422, the contact 372 connects with contact 342 or 345 in intermediate connector block 63, and thus to the safety ground in powerway 21. If female contact 372 projects through opening 423, contact 372 will connect with contacts 343 or 344, and thus to isolated ground in powerway 21. Outlet block housing 360 can be connected to intermediate connector block 360 in a first or a second orientation rotated 180° relative to one another. In the first orientation, contacts 370 and 371 connect with contacts 340 and 341, and contact 372 connects with contact 344 or 345. In the second orientation, contacts 370 and 371 connect with contacts 340 and 345 and contact 372 connects with contact 343 or 344.

Figure 7B:
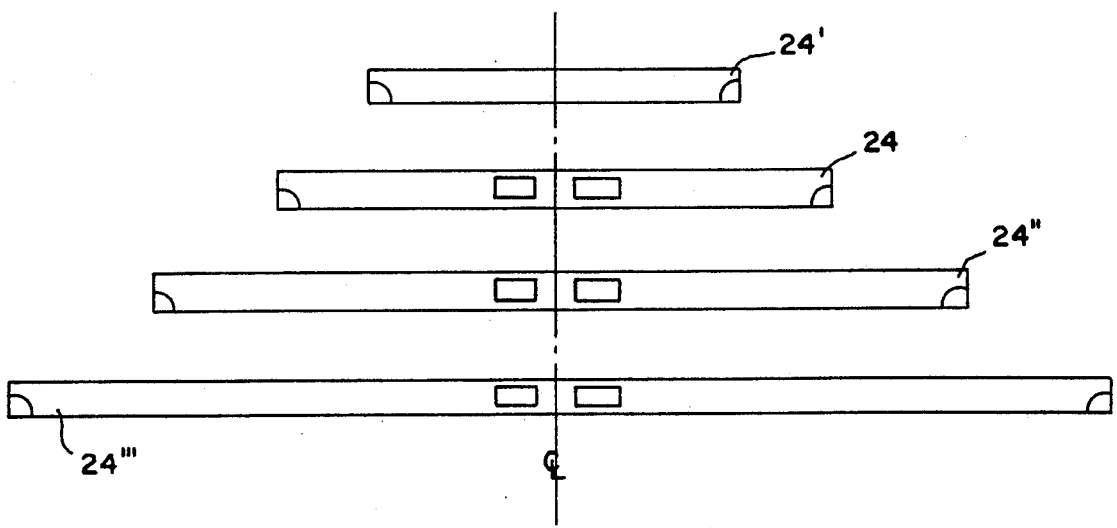
Figure 31:
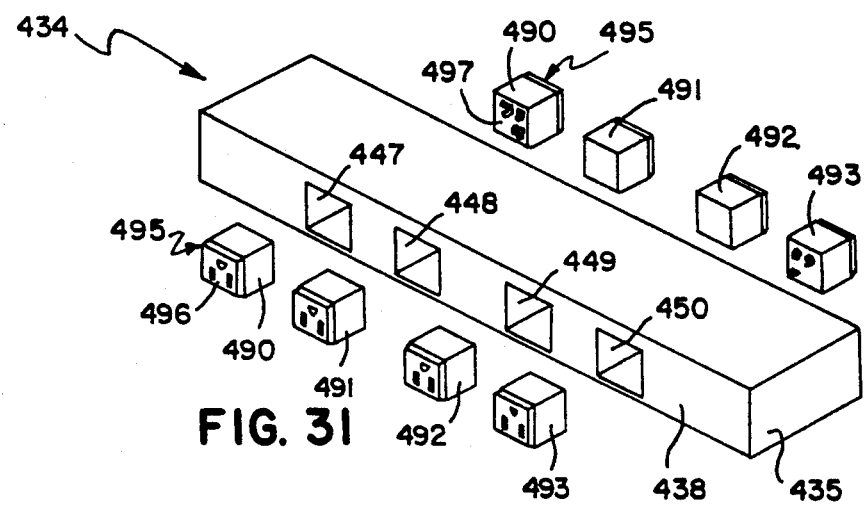
FIG. 31 is an exploded perspective view of the intermediate connector block according to FIG. 30 from another view.
Figure 30:
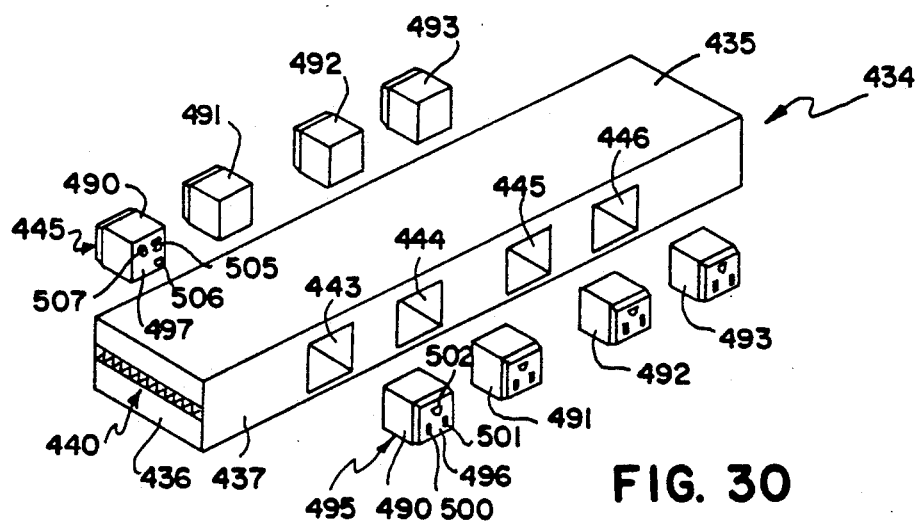
FIG. 30 is an exploded perspective view of a simplex intermediate connector block and simplex outlets according to an alternate embodiment of the invention.
Figure 32:
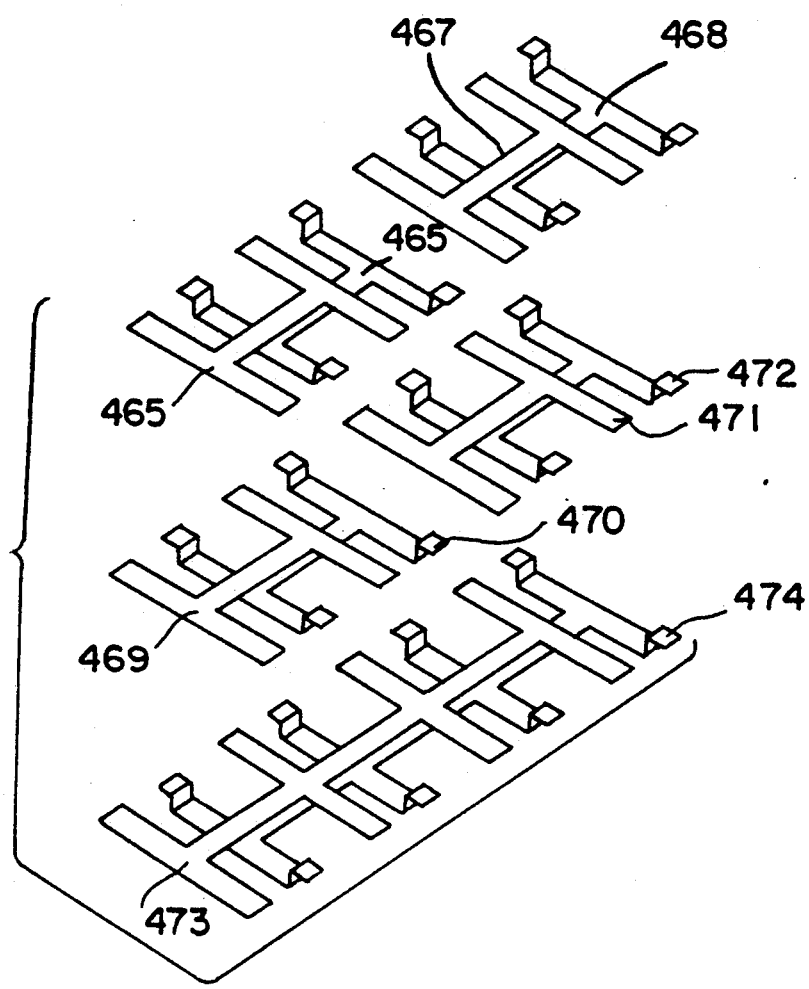
FIG. 32 is a perspective view of bus bars in the intermediate connector block of FIG. 30.
Figure 33:
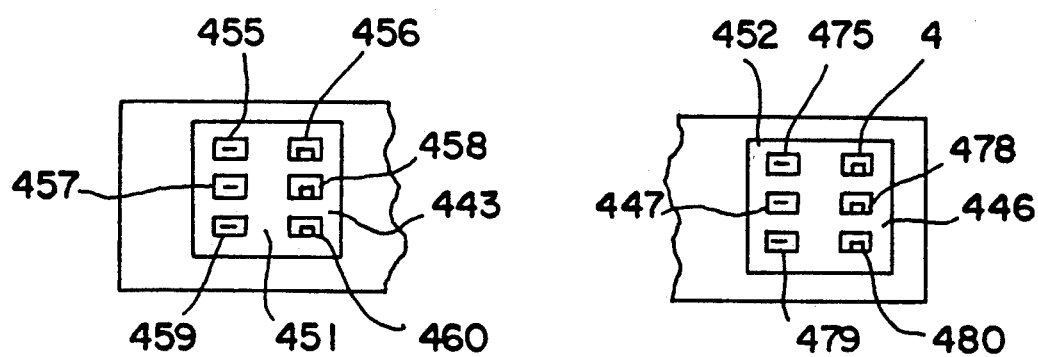
FIG. 33 is a fragmentary side elevational view of the simplex intermediate connector block of FIG. 30.

A simplex intermediate connector block 434 according to yet another embodiment of the invention is illustrated in FIGS. 30-33. Intermediate connector block 434 includes a generally rectangular housing 435 including an end wall 436 and opposite sidewalls 437 and 438. A connector 440 is provided on end wall 436 for connection with port 118. Simplex recesses 443-450 are provided in sidewalls 437 and 438 to receive outlet blocks 490-493. Preferably, power block 96 including port 118 is off set from the center line $C_L$ of base 84 (FIG. 7a) and panel 22 (FIG. 7b) by approximately one half the length of intermediate connector block 434 since the connector block includes an end connector. Accordingly, when intermediate connector block 434 is plugged into port 118, the simplex outlet recesses 443-450 are positioned substantially symmetrically around the center line $C_L$ of panel 22 (FIG. 7b). Receptacle block 434 preferably includes four simplex recesses 443-446 in sidewall 437 and four simplex recesses 447-450 in sidewall 438. A back wall 451 (FIG. 33) in each of recesses 443-446 includes six openings 455-460 and a back wall 452 of recesses 447-450 includes an opening 475-480.

In a preferred embodiment of the invention, ten bus bars 465-474 (FIG. 32) are positioned within housing 435. Bus bars 465-474 are connected to contacts (not shown) which are identical to contacts 127 (FIGS. 17 and 18). Bus bars 465-and 466 are connected to a live conductor and neutral conductor, respectively, of one of the power supply circuits (e.g., L1, N1) through port 118; bus bars 467 and 468 are connected to a live and neutral conductor, respectively, of another one of the power supply circuits (e.g., L2, N2) through port 118; bus bars 469 and 470 are connected to a live and neutral conductor, respectively, of another one of the power supply circuits (e.g., L3, N3) through port 118; bus bars 471 and 472 are connected to a live and neutral conductor, respectively, of another one of the power supply circuits (e.g., L4, N4) through port 118; and bus bars 473 and 474 are connected to a live and neutral conductor, respectively, of the safety ground and isolated ground conductors through port 118. The ten bus bar conductors may thus provide connection to all four power supply circuits in powerway 21 through intermediate connector block 63.

The back wall 451 of each recess 443, 444, 447 and 448 includes six openings 455-460. Opening 455 provides access to bus bar conductor 465; opening 456 provides access to bus bar conductor 466; opening 456 provides access to bus bar conductor 469; opening 458 provides access to bus bar conductor 470; opening 459 provides access to a bus bar conductor 473; and opening 460 provides access to bus bar conductor 474.

Recesses 445, 446, 449 and 450 include six openings 475-480 in a back wall 452. Opening 475 provides access to bus bar 467; opening 476 provides access to bus bar 468; opening 477 provides access to bus bar 471; opening 478 provides access to bus bar 472; opening 479 provides access to bus bar 473; and opening 480 provides access to bus bar 474.

The simplex outlet blocks 490-493 are provided for connection to simplex intermediate connector block 435. Simplex outlet blocks 490-493 are substantially identical. According only outlet block 490 is described in greater detail hereinbelow. Outlet block 490 includes a generally square housing 495 including a front wall 496 and a back wall 497. Front wall 496 includes outlet openings 500-502 for a first outlet. Conventional contacts (not shown) for connection with conventional male contact blades of a two or three prong plug of the type typically found on lamps, typewriters, radios, computer equipment, appliances, and the like, are positioned within housing 495 for access through openings 500-502. Three female contacts 505-507 project outwardly from back wall 497. Contact 505 is connected to the conventional contact accessible through opening 500. Contact 506 is connected to the conventional contact accessible through opening 502. Contact 507 is connected to the conventional contact accessible through opening 501. It is envisioned that outlet blocks 490-493 are keyed according to the circuit, circuit one, circuit two, circuit three, or circuit four, to which it connects. Accordingly, simplex outlet blocks 440 can only be inserted in recesses 443-448, outlet block 491 can only be inserted in recesses 443-448, outlet block 492 can only be connected in recesses 445 and 449, and outlet block 493 can only be inserted in recesses 445-450.

To connect the outlet blocks to port 118, an installer selects outlet blocks according to the circuit to which the outlet block is connected. The installer assembles the selected outlet blocks in the recesses in intermediate connector block 63 or 434. The intermediate connector block 63 or 434 is then assembled to powerway 21 using connector 228 which is plugged into port 118.

Regardless of whether simplex or duplex outlet blocks are connected to powerway 21, the present invention allows a significant increase in the number of outlets connected to a single power supply circuit without exceeding NEC requirements. This increase is provided by intermediate connector block 63, or connector block 439, which makes one connection to powerway 21 through port 118 for outlets connected on both sides of panel 22 If all eight outlets of the outlet blocks connected to intermediate connector block 63, or intermediate connector block 439, are connected to the same power supply circuit (e.g., L1, N1) through intermediate connector block 63, the eight outlets count as a single receptacle under NEC guidelines. If the eight outlets of the outlet blocks connected to intermediate connector block 63, or connector block 439, are connected to two power supply circuits through the intermediate connector block, the eight outlets provided by the outlet blocks count as two receptacles. Accordingly, the number of outlets which can be provided in a panel system without exceeding NEC standards is significantly increased.

The connection of bus bars in the intermediate connector block can limit the number of receptacles counted according to NEC standards. For example, bus bars 465 and 467 can be connected to the same live conductor (e.g., L1) and bus bars 466 and 468 can be connected to the same neutral conductor (e.g., N1). Additionally, bars 469 and 471 can be connected to the same live conductor (e.g., L2) and bus bars 470 and 472 can be connected to the same neutral conductor (e.g., N2). Accordingly, the number of receptacles counted under NEC standards is limited to two.

Figure 34:
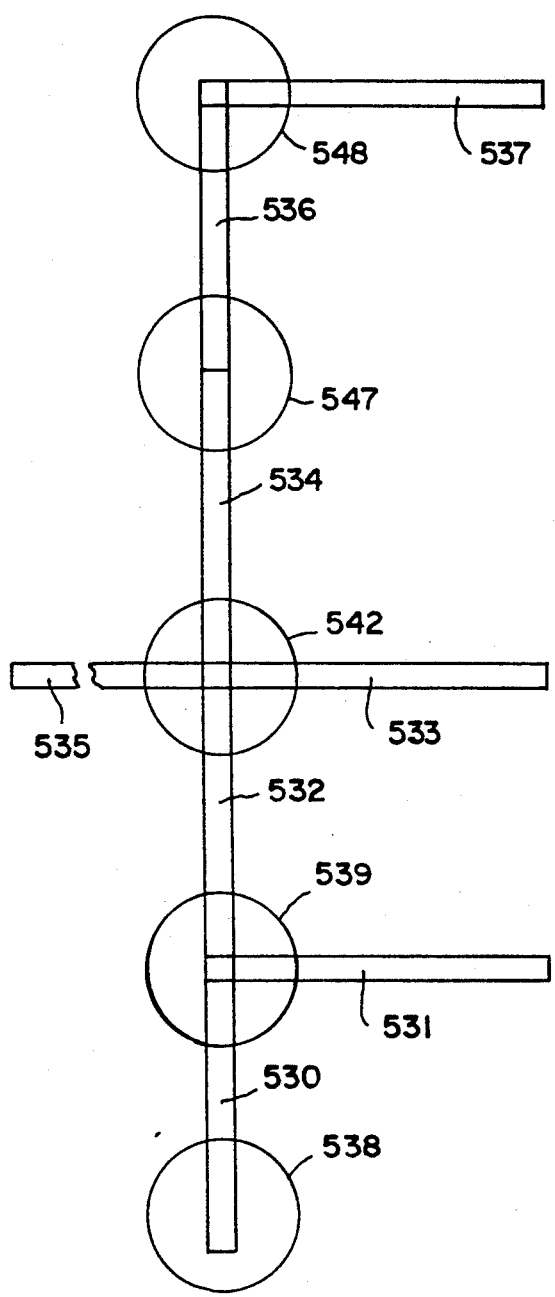
FIG. 34 is a schematic representation of a panel system including power distribution units according to FIG. 1.

A panel system embodying the present invention is illustrated in FIG. 34. The system includes a respective powerways 520-527 (FIGS. 35-39) in each panel 530-537 (FIG. 34) of the furniture system. The powerways in all the panels are identical except that the length of each powerway is proportional to the length of the panels in which the powerway is assembled (see FIG. 7a). For a short panel, powerway 21' includes no central power block 96 For longer panels, the length of powerways 21, 21" and 21'" increases, but back wall 107 of power block 96 remains at center line $C_L$. The face plate 25 of each panel is the same length as the panel For a short panel, face plate 24' includes no openings for outlets For longer panels, the openings 30 and 31 of panels 24, 24" and 24'" are symmetrically positioned around centerline $C_L$. Thus, the distance between the ends of the powerway housing 63 and the lateral edges of the panel 22 is the same regardless of the length of panel 22. This distance is no greater than one half the length of cables 197 and 198 of T-connector 28. This insures that the powerways in one panel are able to connect with the powerways in adjacent panels.

Figure 39:
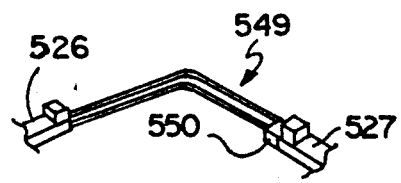
FIG. 39 is an L-connection of powerways in the panel system according to FIG. 34.
Figure 38:
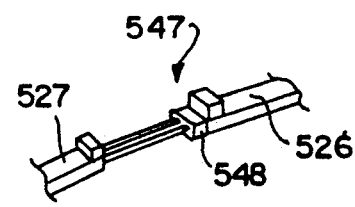
FIG. 38 is an in line connection of powerways in the panel system according to FIG. 34.
Figure 37:
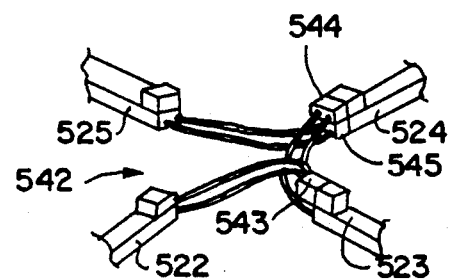
FIG. 37 is an X-connection in the panel system according to FIG. 34.
Figure 36:
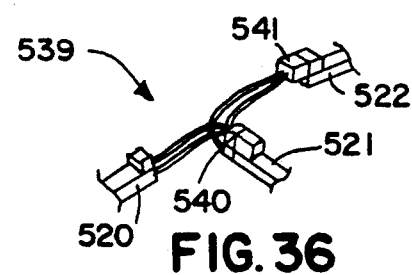
FIG. 36 is a T-connection in the panel system according to FIG. 34.
Figure 35:
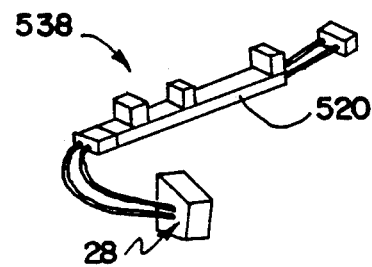
FIG. 35 is a power tap-in to the panel system according to FIG. 34.

The panel system includes a power-in 538 including power tap-in 28 (FIG. 35) connected to powerway 520. The power tap-in is the input connection for the entire panel system of FIG. 34. As illustrated in FIG. 36, a T-connection 539 is provided for powerways 520-522 by connecting the T-connector 540 of powerway 520 with an upper port of powerway 521 and the T-connector 541 of powerway 521 to an upper port in powerway 522. An X-connection 542 for powerways 522-525, is illustrated in FIG. 37. The X-connection 542 is provided by connecting the T-connector 543 of powerway 522 to a port of powerway 523, T-connector 544 of powerway 523 to a port of powerway 524, and the T-connector 545 of powerway 525 to another port of powerway 524. A straight line connection 547 of two powerways 524 and 526 is illustrated in FIG. 38. A T-connector 548 or powerway 524 is connected to a port of powerway 526. An L-connection 549 is illustrated in FIG. 39. The T-connector 550 of powerway 526 is folded around a corner and connected to a port of powerway 527. Although the panel system illustrated in FIGS. 33−38 includes only straight and orthogonal connections, the woven sheathing of cables 178 and 179 of the T-connectors allow these connectors to be manipulated around a corner at any angle. This ability to manipulate is surprisingly provided despite the fact that the cables are mounted side-by-side in a horizontal plane and the manipulation of connectors is often in a horizontal plane.

Accordingly, it can be seen that a panel electrification system providing ease of installation and versatility in rearrangement is disclosed. The electrification system includes a large number of conductors which can be provided in utility raceways originally designed for fewer electrical conductors. Additionally, the system provides versatility in connecting outlets to different power supply circuits in the power block without compromising the ability of the system to be retrofit into existing utility raceways Additionally, the system utilizes cables having woven sheathing providing a great degree of flexibility in manipulating the cable around corners. The woven sheathing is attached to a connector using fasteners which provide a quick, secure connection thereby facilitating efficient assembly of the powerway.

In the foregoing description, it will be readily perceived by those skilled in the art that modifications may be made to the invention without departing from the concepts disclosed herein Such modifications are to be considered included in the following claims unless these claims by their language expressly state otherwise.

The embodiments of the invention in which an exclusive property or privilege is claimed are defined as follows.

1. A power distribution unit for office furniture of the type including a utility raceway, comprising:
   an elongated powerway including a powerway housing adapted to be assembled horizontally within the utility raceway of an associated office furniture unit;
   a plurality of powerway conductors positioned within said powerway housing;
   at least one vertically accessible powerway port of the powerway in the utility raceway, said port including contacts coupled to said powerway conductors; and
   an electrical connector including contacts coupled to an electrical device, said connector contacts adapted to connect with said port contacts, whereby said powerway is assembled in the utility raceway and said electrical device and said powerway housing are vertically stacked in the utility raceway such that said connector contacts are connected to said port contacts to connect said electrical device to said powerway conductors.

2. The power distribution unit as defined in claim 1, wherein said electrical device includes at least one intermediate connector block adapted to be positioned above said powerway housing in the utility raceway.

3. The power distribution unit as defined in claim 2, wherein said electrical device further includes an outlet block adapted to be assembled to said intermediate connector block, said outlet block including power outlets for said power distribution unit.

4. The power distribution unit as defined in claim 1, wherein said powerway housing includes an upwardly projecting powerway connector block including said port, said powerway connector block positioned approximately at the center of said powerway housing 5. The power distribution unit as defined in claim 4, said electrical device includes a generally C-shaped intermediate connector block, said C-shaped receptacle including a recess, said powerway connector block received in said recess of said C-shaped intermediate connector block when said intermediate connector block is positioned above said powerway housing.

6. The power distribution unit as defined in claim 1, further including an electrical connector adapted to mate with a port of a powerway associated with an adjacent panel.

7. The power distribution unit as defined in claim 6, wherein said electrical connector includes a plurality of contacts and said adjacent panel port includes a plurality of contacts, said electrical connector adapted to connect with said contacts in said port of said powerway associated with said adjacent panel.

8. The power distribution unit as defined in claim 7, further including at least two sheaths extending side-by-side in a mutually common plane between said powerway housing and said electrical connector, each of said sheaths enclosing some of said powerway conductors whereby said electrical connector is readily manipulated into connection with said part associated with said adjacent panel.

9. The power distribution unit as defined in claim 8, wherein said sheaths include woven cord.

10. The power distribution unit as defined in claim 8, wherein said at least two sheaths extend side-by-side in a horizontal plane at least at a fixed end connected to said powerway housing.

11. The power distribution system as defined in claim 8, further including a respective fastener attached over each said sheath to secure each said sheath to said electrical connector.

12. The power distribution unit as defined in claim 11 wherein each said fastener includes teeth which bite into each said sheath when each said fastener is assembled to each said sheath.

13. The power distribution unit as defined in claim 8, further including a respective fastener for each said sheath, each said fastener including:
first and second sections;
hinge means carried on said first and second sections of said fastener for providing a hinge
between said first and second sections
a first mechanical connector on one of said first and second sections;
a second mechanical connector on the other one of said first and second sections;
wherein said fastener is attached to one of said sheaths by folding said sections at said hinge means and interconnecting said first and second mechanical connectors whereby said fastener secures said sheath on said connector.

14. A power distribution unit for office furniture of the type including a utility raceway, comprising:
a powerway including a powerway housing adapted to be assembled within the utility raceway of the office furniture, said powerway housing including at least one substantially vertical face and a port in said at least one substantially vertical face;
a plurality of powerway conductors positioned within said powerway housing, said powerway conductors accessible through said port;
a intermediate connector block including a intermediate connector block housing;
a plurality of intermediate connector block conductors positioned within said intermediate connector block housing;
at least one outlet block including an outlet block housing adapted to be assembled to said intermediate connector block, said outlet block including openings; and
a plurality of outlet block conductors supported in said at least one outlet block housing, said outlet block conductors accessible through said openings, whereby said at least one outlet block provides power outlets for said power distribution unit when said powerway housing is assembled in said utility raceway and said at least one outlet block is assembled to said intermediate connector block such that said outlet block conductors are connected to said intermediate connector block conductors and said intermediate connector block is positioned above said powerway housing in the utility raceway such that said intermediate connector block conductors are connected to said powerway conductors through said port.

15. A power distribution unit for office furniture of the type including a utility raceway, comprising:
a powerway including a powerway housing adapted to be assembled within the utility raceway of an associated office furniture unit, said powerway including a plurality of conductors positioned within said powerway housing and said powerway housing including a top and at least one powerway connector block projecting upwardly from said top, said powerway conductors including contacts in said powerway connector block; and
a intermediate connector block adapted to be positioned above of said powerway housing within the utility raceway, said intermediate connector block including a generally C-shaped housing and a plurality of conductors positioned within said intermediate connector block housing, said intermediate connector block conductors including contacts adapted to mate with said powerway contacts, whereby said powerway is assembled in the utility raceway and said C-shaped housing is positioned over said powerway connector block within said utility raceway such that said intermediate connector block contacts are connected to said powerway contacts to connect said intermediate connector block conductors to said powerway conductors.

* * * * *

UNITED STATES PATENT AND TRADEMARK OFFICE
CERTIFICATE OF CORRECTION

Page 1 of 2

PATENT NO. : 5,277,609
DATED : January 11, 1994
INVENTOR(S) : Charles C. Ondrejka It is certified that error appears in the above-indentified patent and that said Letters Patent is hereby corrected as shown below:

The Title page, item [54] and col. 1, line 1-2, Title chould be "MODULAR POWERWAY FOR PARTITION PANELS AND THE LIKE (C-39)".

Title page, item [57], Abstract, line 3; "A" should be --An--.
Column 1, lines 26 and 27;
    "effect" should be --affect--.
Column 1, line
    "system" should be --systems--.
Column 1, line 34;
    "system" should be --systems--.
Column 2, line 3;
    Delete "the" second occurrence.
Column 2, line 6;
    "a" should be --an--.
Column 2, line 14;
    "a" should be --an--.
Column 2, line 60;
    After "is" insert --a--.
Column 3, line 23;
    "XIV-XIV" should be --XV-XV--.
Column 3, line 27;
    "XIV-XIV" should be --XVI-XVI--.
Column 4, line 19;
    After "furniture" insert --.--.
Column 5, line 67;
    After "21" insert --.--.
Column 9, line 59;
    After "material" insert --.--.

UNITED STATES PATENT AND TRADEMARK OFFICE
CERTIFICATE OF CORRECTION

PATENT NO. : 5,277,609
DATED : January 11, 1994
INVENTOR(S) : Charles C. Ondrejka It is certified that error appears in the above-indentified patent and that said Letters Patent is hereby corrected as shown below:

```
Column 14, line 55;
     After "22" insert --.--.
Column 15, line 20;
     After "96" insert --,--.
Column 15, line 24;
     After "panel" (first occurrence) insert --.--.
Column 15, line 25;
     After "outlets" insert --.--.
Column 16, line 4;
     After "raceways" insert --.--.
Column 16, line 14;
     After "herein" insert --.--.
```

Signed and Sealed this

Thirtieth Day of August, 1994

Attest:

BRUCE LEHMAN

Attesting Officer

Commissioner of Patents and Trademarks